June 21, 1966 W. C. KAHN 3,257,498
FLUID-TIGHT CABLE CONNECTING MEANS
Filed July 26, 1963 3 Sheets-Sheet 3
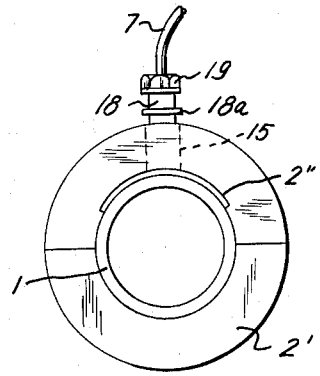
FIG. 7
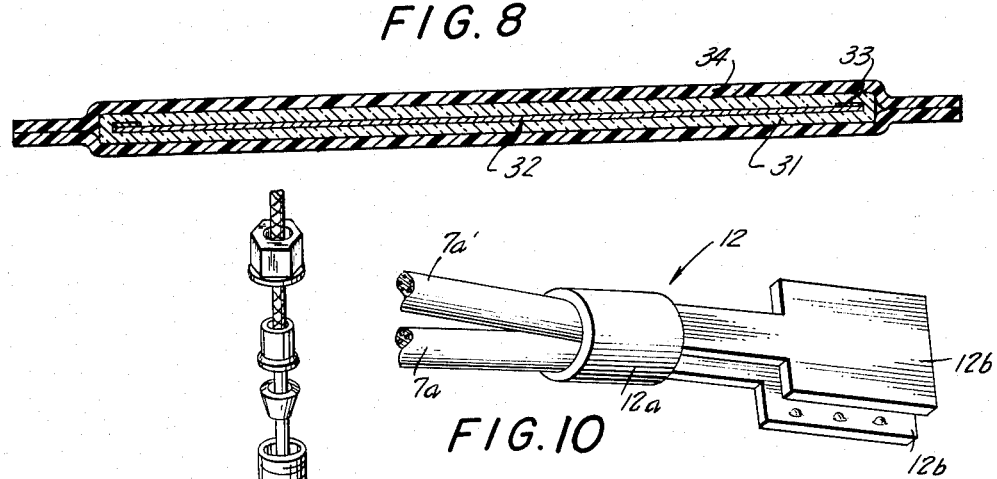
FIG. 8
FIG. 10
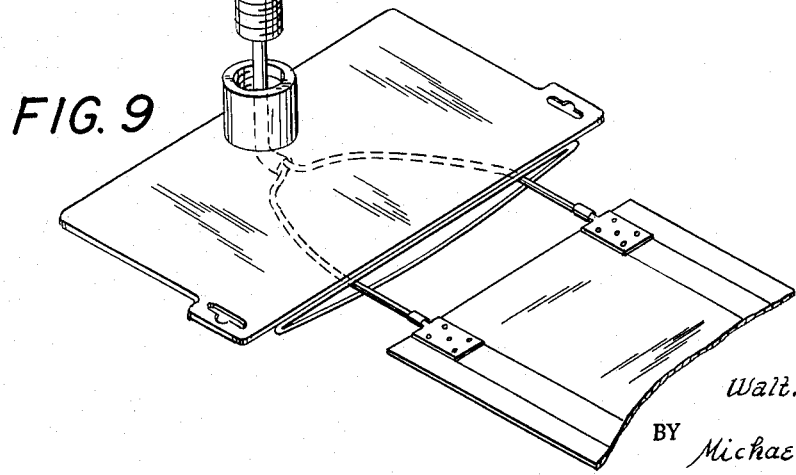
FIG. 9
INVENTOR.
Walter C. Kahn
BY Michael S. Striker
ATTORNEY United States Patent Office
3,257,498
Patented June 21, 1966

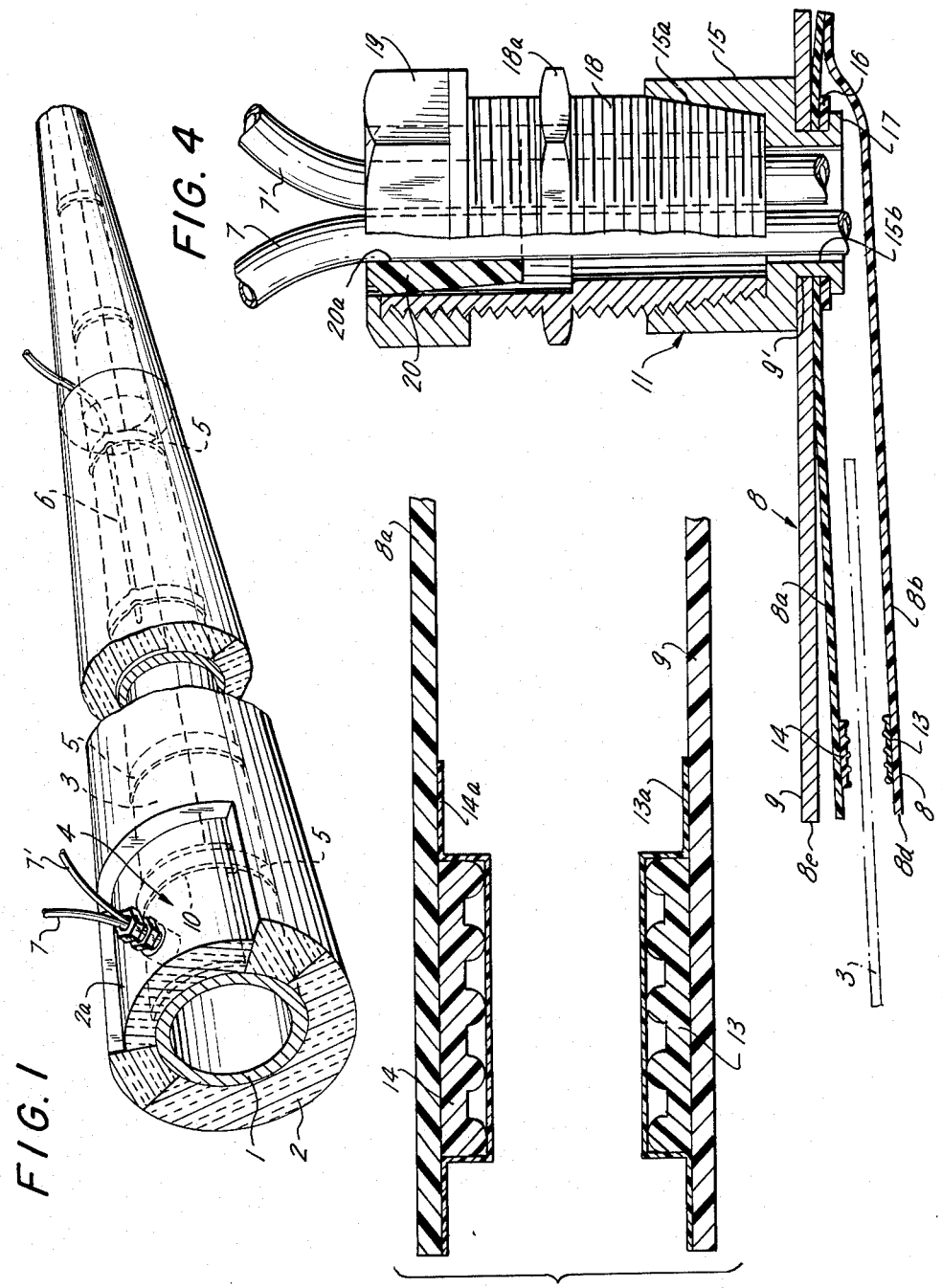

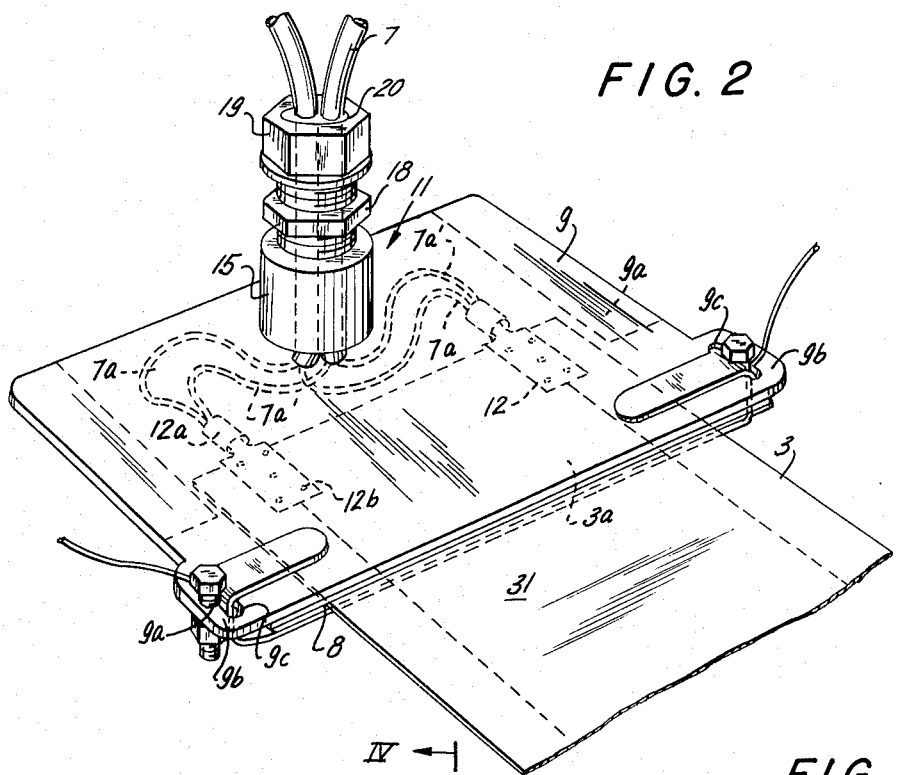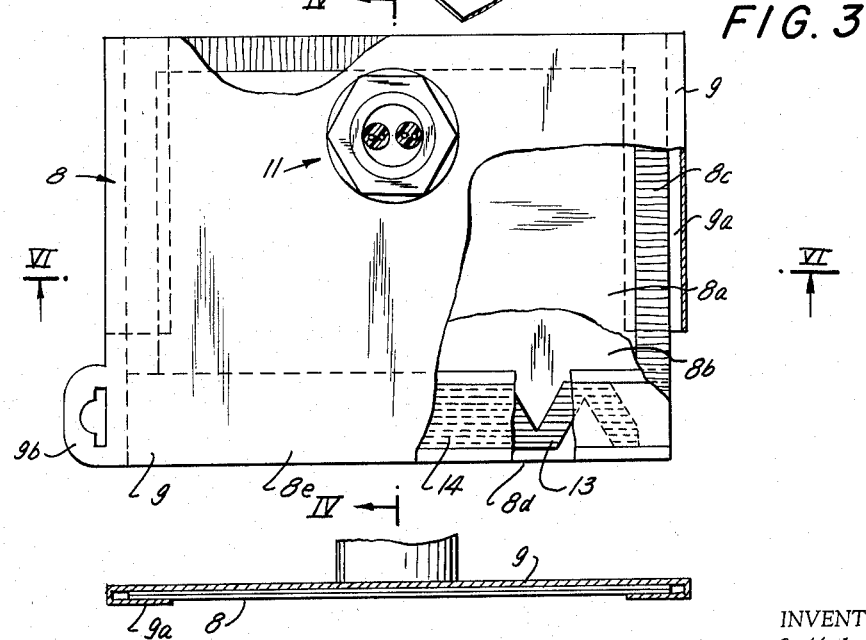

3,257,498
FLUID-TIGHT CABLE CONNECTING MEANS
Walter C. Kahn, 1 Berndale Drive, Westport, Conn.
Filed July 26, 1963, Ser. No. 297,774
10 Claims. (Cl. 174—75)

The present invention relates to a connector assembly, and more particularly to a connector assembly for covering, insulating, and protecting the end portion of a conductor, such as a strip-shaped insulated resistance element.

In order to connect the conductive parts of an insulated conductor with a source of voltage, or other electric apparatus, it is necessary to expose the metallic conductive parts which are thus exposed to the corroding influence of the atmosphere. Furthermore, strip-shaped insulated electric resistance elements are known which are advantageously used for heating pipes, and it is desirable to protect the electrodes or terminals of such electric resistance elements at the point where the same are connected to other electric apparatus.

It is one object of the invention to provide a fluid tight flexible, permanently deformable, heat resistant, electrically insulating but groundable connector assembly for covering and protecting electric connections.

Another object of the present invention is to provide a connector assembly enveloping the end portion of the connector, another wire, and means connecting the end portion of the conductor to the other wire in such a manner that neither air nor moisture can come in contact with conductive parts.

Another object of the present invention is to provide a connector assembly for the end portion of a strip-shaped insulated electric resistance element.

Another object of the present invention is to provide an easily assembled and inexpensively manufactured connector assembly which provides a fluid-tight seal about the junction of two electric conductors and is capable of sustaining temperatures of over 300° F.

Another object of the present invention is to provide a flexible connector assembly for the end of a strip-shaped electric heating element which can be bent and shaped with the heating element to assume the contour of a pipe to which the strip-shaped heating element and the connector assembly are attached.

With these objects in view, the present invention relates to a connector assembly which comprises bag means open at one end to receive a conductor end portion, for example the end portion of an insulated strip-shaped resistance element; holder means secured to the bag means and preferably including a sealing member; wire means passing through a passage in the sealing member of the holder means tightly fitting therein and having an end portion located in the bag means; connector means located in the bag means secured to the end portion of the wire means and attached to the terminals of the conductor; and means for sealing and tightly closing the open end of the bag means and preferably including sealing means at the open end of the bag means, and a metal shield for compressing the bag means.

In this manner, a tight seal is formed about the end portion of the conductor or strip-shaped resistance element, while another seal is formed about the wire means in the holder means. In this manner, the junction between the conductive parts is completely protected from moisture and from other substances which may cause corrosion.

In the preferred embodiment, the bag means include a flat rectangular flexible bag having two superimposed walls and an open end bounded by two opposite straight edge portions of the walls to which sealing strips are secured. One of the sealing strips is preferably zig-zag shaped, while the other sealing strip is straight. When the connector assembly is used for a strip-shaped insulated resistance element, the ends of the wire means are attached by clamping means to the terminal for electrodes of the resistance element.

When the connector assembly is mounted on a pipe which is heated by the resistance element, the flexible bag is pressed by the metal shield and attaching straps against the surface of the pipe, and the flexible bag and the metal shield are bent to follow the contour of the pipe.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view illustrating a connector assembly according to the invention attached to a strip-shaped resistance element and mounted on an insulated pipe;

FIG. 2 is a perspective view illustrating the connector assembly according to one embodiment;

FIG. 3 is a plan view of the connector assembly with parts broken off to show the interior of the bag;

FIG. 4 is a sectional view taken on line IV—IV in FIG. 3;

FIG. 5 is a sectional view illustrating a detail of FIG. 4 on an enlarged scale;

FIG. 6 is a cross sectional view taken on line VI—VI in FIG. 4;

FIG. 7 is an end view of an insulated pipe with a connector assembly mounted in accordance with a modified embodiment;

FIG. 8 is a cross sectional view of a strip shaped heating element for which the connector assembly is particularly suited;

FIG. 9 is a perspective exploded view of a modified connector assembly; and

FIG. 10 is a perspective view of the clamping connectors.

Referring now to the drawings, and more particularly to FIG. 1, a pipe 1 through which a fluid flows, is enveloped by an insulating cover material 2 which is composed of two connected halves. A first conductor, for instance a strip-shaped heating element 3 is disposed on the outer surface of pipe 1 extending along the length of the same. As shown in FIG. 8, the heating element includes, for example, two thin insulating glass-asbestos fiber layers 31, and embedded in the same a resistance layer 32 of graphite dispersed in silica, and two elongated electrodes 33 extending adjacent the edges of the strip-shaped heating element 3 and being connected to opposite sides of the electric resistance so that a voltage applied to the electrodes 33 will cause a current to flow across the length of the strip-shaped heating element. Two outer layers 34 of material marketed under the trade names Teflon or Alcar are heat-bonded to layers 31, and have laterally projecting superimposed edge portions heat-bonded to each other. In the embodiment of FIG. 1, the insulating material has a cutout 2a in which the end of the heating element 3 is located, and a connector assembly 4 according to the present invention envelops the end of the heating element 3 and covers the junction between the ends of the wires 7, 7' and the electrodes of a second conductor, namely the heating strip 3. Straps 5 hold the heating strip on pipe 1, and the straps are also used for holding a thermostat bulb 6 on the heating element 3. In the modified arrangement shown in FIG. 7, the insulating material 2' has a curved recess 2" into which the connector assembly 4 fits.

Referring now to FIG. 2, the strip shaped conductor and heating element 3 has an end portion 3a inserted into the open end of a flexible flat bag 8 which forms part of the connector assembly 4 of the present invention. The bag 8 is of rectangular shape, and is covered by a flexible, permanently deformable metal shield 9 consisting of aluminum or stainless steel which has lateral clamping portions 9a bent inward to clamp the edges of bag 8. The metal shield 9 has also attaching portions 9b formed with slots 9c into which the ends of a metal strap 10 pass which serves to tightly close the open end of bag 8 after insertion of a strip shaped heating element 3.

Slots 9c have recesses 9d for a grounding screw 9e which clamps a grounding wire 9e to metal shield 9.

Wire means 7, 7' pass through holder means 11 and through an opening in shield 9 into the interior of bag 8, where two pairs of wires 7a, 7a' are secured to the necks 12a of connector means 12 having clamping portions 12b with projecting points which penetrate the insulating layers of the heating element 3 and are in conductive connection with the longitudinally extending electrodes or terminals 31 of the heating element 3. Wire 7 may be connected to a voltage, and wire 7' to a corresponding wire of another heating element.

The construction of the connector assembly is best seen in FIGS. 3 to 6. Bag 8 is of rectangular shape and has a top wall 8a and a bottom wall 8b which are connected along three edges by a heat seal 8c. The straight edge portions 8d and 8e bound the open end of bag 8. A zigzag shaped sealing strip 13 is secured to edge portion 8e. The sealing strips 13 and 14 confront each other and are consequently located on opposite sides of the heating element 3 when the same is inserted into the pocket formed by the bag 8. The sealing strips 13 and 14, which preferably consist of silicone, are advantageously covered and held in place by thin strips 13a and 14a of plastic material available under the trademark Teflon and which are bonded to walls 8a and 8b which preferably are made of Teflon and glass-fiber material available under the trademark Fiberglas.

The holding means 11 is assembled of several parts. A tubular base 15 having an inner conical thread 15a, has a neck portion 15b passing through a circular opening 9' in the metal shield 9 and through a corresponding opening in wall 8a into the interior of bag 8 where the neck portion is crimped to form a flange 17 abutting a silicone sealing ring 16 whereby the tubular base portion 15 is secured to the bag and to shield 9 in a fluid tight manner.

A threaded member 18 having a hexagonal flange 18a is threaded into thread 15a, and has an annular inner shoulder on which a conical sealing member 20 is seated. Sealing member 20 has two bores 20a for wires 7, 7' and is compressed by a cap 19 having an inner thread meshing with the upper portion of the threaded member 18. By tightening cap 19, the resilient sealing member 20, which preferably consists of silicone, is compressed so that wires 7, 7' are fluid tightly sealed in bores 20a of sealing member 20.

FIG. 9 illustrates a modified construction in which a single wire 7 passes tightly through a single hole in the silicone sealing member 20' so that a single wire 7a is connected to each terminal 12 which is sufficient to apply a voltage to one end of the heating element so that current flows across the length of the same.

The end of wire 7 is armored by crossing wires 71 which are connected to a tubular anchoring member which is clamped by the cap 19. It is evident that corresponding strain relieving and anchoring means can be used in the holder construction shown in FIG. 4.

The connector assembly is attached to a strip-shaped heating element 3 in the following manner: The wire means 7 are inserted through the sealing member 20' and tubular base 15 into the interior of the bag 8, and the wire end portions 7a are pulled out of the open end of the bag as shown in FIG. 9. The clamping sleeves 12a are secured by a suitable tool to the ends of wires 7a, whereupon the cut off end portion of the heating element 3 is placed between opposite clamping plates 12b of clamping connectors 12. The clamping plates are pressed toward each other by a suitable tool, and pointed projections on the inside of the clamping plates 12b penetrate the insulating layers of heating element 3 and contact the electrodes 31. At the same time, the projections of the clamping connectors 12 establish a firm mechanical connection between wires 7a and heating elements 3, so that the heating element can be pulled into the interior of the bag by pulling the wire 7 upward. When the heating element is in a suitable position, cap 19 is tightened so that wire 7 is clamped and sealed by a sealing member 20.

The assembly of the embodiment of FIG. 1 carried out in the same manner, but two wires 7, 7' are inserted into two openings 20a in sealing member 20, and two wires 7a, 7a' are clamped to each connector 12.

When strap 10 is tightened to abut the lower wall of bag 8, as shown in FIG. 2, shield 9 is pressed against bag 8, and the sealing strips 13 and 14 are pressed against the insulating layers 34 of the heating element 10, and laterally of the same against each other so that a fluid tight seal is established at the thus closed mouth of bag 8. In this manner, the metal parts 12, and the exposed conductive parts of wires 7a, 7a' and of electrodes 3', as well as the conductive resistance layer 32, which is exposed along the cut off end of the heating element, are protected from any moisture or other substance which may cause corrosion.

Due to the fact that the bag 8, and the thin metal shield 9 are completely flexible, the connector assembly can be shaped to any desired curvature, as may be necessary for following the curvature of a pipe. Since metal shield 9 is permanently deformable and retains any curved shape into which it is bent, the entire connector assembly retains this shape. The zig-zag shape of the sealing strip 13 renders the inner edge portion 8d completely flexible. Sealing strips 13 and 14 are preferably provided with longitudinal ridges and grooves which improve the sealing contact.

It will be understood that each of the elements described above, or two or more together, may also find a useful application in other types of connector assemblies differing from the types described above.

While the invention has been illustrated and described as embodied in a flexible connector assembly for protecting the end of a strip-shaped insulated heating element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A connector assembly comprising, in combination, bag means open at one end; a first conductor having an end portion extending through said open end and into the interior of said bag means; holding means secured to said bag means and having passage means communicating with the interior of said bag means; second conductor means passing through said passage means of said holding means tightly fitting therein and having an end portion located in said bag means; connector means located in said bag means secured to said end portion of said second conductor means and adapted to be attached to said first conductor end portion; and means for tightly closing said open end of said bag means whereby said first conductor end portion is protected.

2. A connector assembly comprising, in combination, flexible bag means open at one end; a first conductor having an end portion extending through said open end and into the interior of said bag means, said bag means having sealing means at said open end; holding means secured to said bag means and having a sealing member formed with passage means communicating with the interior of said bag means; second conductor means passing through said passage means of said sealing member tightly fitting therein and having an end portion located in said bag means; connector means located in said bag means secured to said end portion of said wire second conductor means and adapted to be attached to said first conductor end portion; and means for tightly closing said open end of said bag means so that said sealing means close the open end of said bag means and tightly abut the first conductor end portion in sealing engagement whereby said first conductor end portion is protected.

3. A connector assembly comprising, in combination, bag means open at one end; a first conductor having an end portion extending through said open end and into the interior of said bag means; holding means secured to said bag means and having passage means communicating with the interior of said bag means; second conductor means passing through said passage means of said holding means tightly fitting therein and having an end portion located in said bag means; connector releasable means located in said bag means secured to said end portion of said second conductor means and having clamping means adapted to be releasably secured to said first conductor end portion; and means for tightly closing said open end of said bag means whereby said first conductor end portion is protected.

4. A connector assembly comprising, in combination, flexible bag means open at one end; a first conductor having an end portion extending through said open end and into the interior of said bag means, said bag means having sealing means at said open end; a metal shield superimposed on said bag means; holding means secured to said bag means and to said metal shield passing through the latter and having a sealing member formed with passage means communicating with the interior of said bag means; second conductor means passing through said passage means of said sealing member tightly fitting therein and having an end portion located in said bag means; connector means located in said bag means secured to said end portion of said second conductor means and adapted to be attached to said first conductor end portion; and means attached to said metal shield and adapted to exert pressure through said metal shield on said bag means for tightly closing said open end of said bag means so that said sealing means close the open end of said bag means and tightly abut the first conductor end portion in sealing engagement whereby said first conductor end portion is protected.

5. A connector assembly comprising, in combination, a flat flexible bag having two opposite walls and having an open end bounded by two opposite edge portions of said walls; an insulated strip-shaped first conductor having an end portion having two terminals, said end portion with said terminals extending through said open end into the interior of said bag; sealing means secured to each of said opposite edge portions along the length of the same and confronting each other so that said end portion of the strip-shaped first conductor is located between said sealing means; tubular holding means including a sealing member and being fluid-tightly secured to one of said opposite walls, said sealing member having passage means communicating with the interior of said bag; second conductor means passing through said passage means of said sealing member fluid-tightly fitting therein and having an end portion located in said bag; connector means located in said bag secured to said end portion of said second conductor means and adapted to be detachably attached to the terminals of the strip-shaped first conductor; and means for tightly closing said open end of said bag so that said sealing means partly abut each other, and partly abut the end portion of the strip-shaped first conductor in sealing engagement whereby the terminals of the first conductor are protected.

6. A connector assembly comprising, in combination, a flat flexible bag having two opposite walls and having an open end bounded by two opposite edge portions of said walls; an insulated strip-shaped first conductor having an end portion having two terminals, said end portion with said terminals extending through said open end into the interior of said bag; sealing means including a zig-zag shaped sealing strip secured to one of said edge portions, and a straight sealing strip secured to the other edge portion along the length of the same, said sealing strips confronting each other so that said end portion of the strip-shaped first conductor is located between said sealing strips; tubular holding means including a sealing member and being fluid-tightly secured to one of said opposite walls, said sealing member having passage means communicating with the interior of said bag; second conductor means passing through said passage means of said sealing member fluid-tightly fitting therein and having an end portion located in said bag; connector means located in said bag secured to said end portion of said second conductor means and adapted to be detachably attached to the terminals of the strip-shaped first conductor; and means for tightly closing said open end of said bag so that said sealing strips partly abut each other, and partly abut the end portion of the strip-shaped first conductor in sealing engagement whereby the terminals of the first conductor are protected.

7. A connector assembly as set forth in claim 6 wherein said sealing strips have grooves and ridges.

8. A connector assembly as set forth in claim 6 and including thin strips of an insulating material covering said sealing strips and bonded to said edge portions.

9. A connector assembly comprising, in combination, a rectangular flat flexible bag having two opposite walls and having an open end bounded by two opposite straight edge portions of said walls, said bag being adapted to receive an end portion of an insulated strip-shaped electric heating element having two terminals; sealing means including a zig-zag shaped sealing strip secured to one of said edge portions, and a straight sealing strip secured to the other edge portion along the length of the same, said sealing strips confronting each other so that said end portion of the strip-shaped conductor is located between said sealing strips; a metal shield superimposed on one of said walls and having lateral clamping portions bent inward to abut the other wall, and lateral attaching portions at the ends of said edge portions; tubular holding means including a sealing member and being fluid-tightly secured to one of said opposite walls and to said metal shield, said holding means, said sealing member having passage means communicating with the interior of said bag; wire means passing through said passage means of said sealing member fluid-tightly fitting therein and having an end portion located in said bag; connector means located in said bag secured to said end portion of wire means and adapted to be detachably attached to the terminals of the strip-shaped heating element; and strap means connected to said lateral attaching portions of said metal shield and abutting said other wall along said open end of said bag for pressing said metal shield against said bag for tightly closing said open end of said bag so that said sealing strips partly abut each other, and partly abut the end portion of the strip-shaped heating element in sealing engagement whereby the terminals of the heating element are protected.

10. A connector assembly comprising, in combination, bag means open at one end; a first conductor having an end portion extending through said open end and into the interior of said bag means; holding means secured to one wall of said bag means and including an elastic sealing member formed with at least one passage communicating with the interior of said bag means, and means for resiliently compressing said elastic sealing member so that the size of said passage is reduced; second conductor means passing through said passage fluid-tightly fitting in said reduced passage and adapted to be inserted into said passage when the size of the same is not reduced, said second conductor means having an end portion located in said bag means and adapted to be attached to the first conductor end portion; and means for tightly closing said open end of said bag means whereby said first conductor end portion and said end portion of said second conductor means are protected.

References Cited by the Examiner

UNITED STATES PATENTS

| | | | |
|---|---|---|---|
| 2,352,159 | 6/1944 | Brodie | 174—88 X |
| 2,564,302 | 8/1951 | Fraser | 174—65 |
| 2,619,580 | 11/1952 | Pontiere | 219—528 |
| 2,795,685 | 6/1957 | Browne | 219—528 |
| 2,986,409 | 4/1961 | Weber. | |
| 3,088,090 | 4/1963 | Cole et al. | 174—88 X |
| 3,093,720 | 6/1963 | Patrick | 219—544 |

ROBERT K. SCHAEFER, *Primary Examiner.*

DARRELL L. CLAY, JOHN F. BURNS, *Examiners.*

W. B. FREDRICKS, J. F. RUGGIERO,
*Assistant Examiners.*